June 25, 1935.  R. F. PEO  2,005,751
THERMOSTATIC VALVE STRUCTURE FOR HYDRAULIC SHOCK ABSORBERS
Original Filed April 29, 1933  2 Sheets-Sheet 1
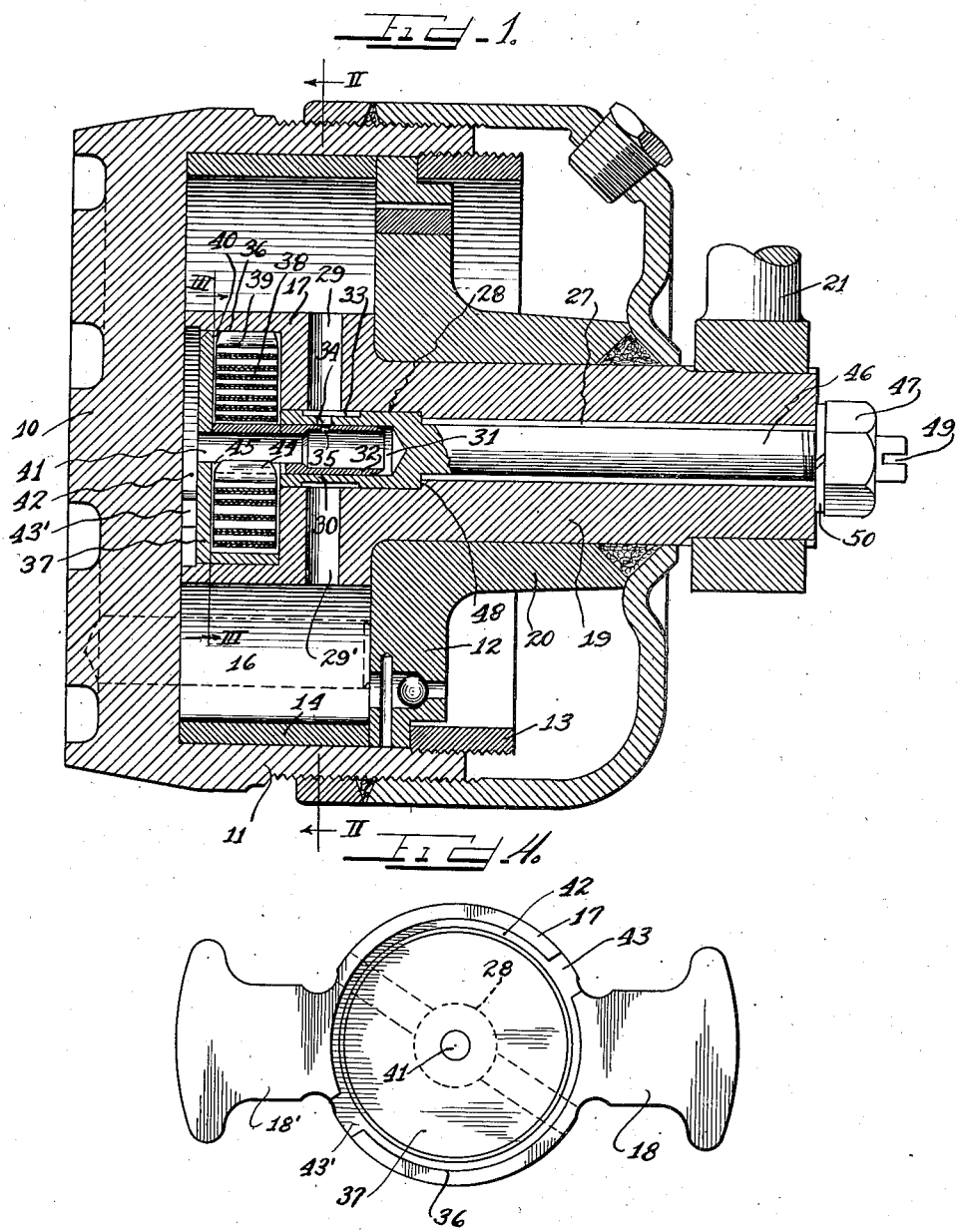
Inventor
Ralph F. Peo.
by Charles F. Hill Attys.

June 25, 1935.   R. F. PEO   2,005,751
THERMOSTATIC VALVE STRUCTURE FOR HYDRAULIC SHOCK ABSORBERS
Original Filed April 29, 1933   2 Sheets-Sheet 2
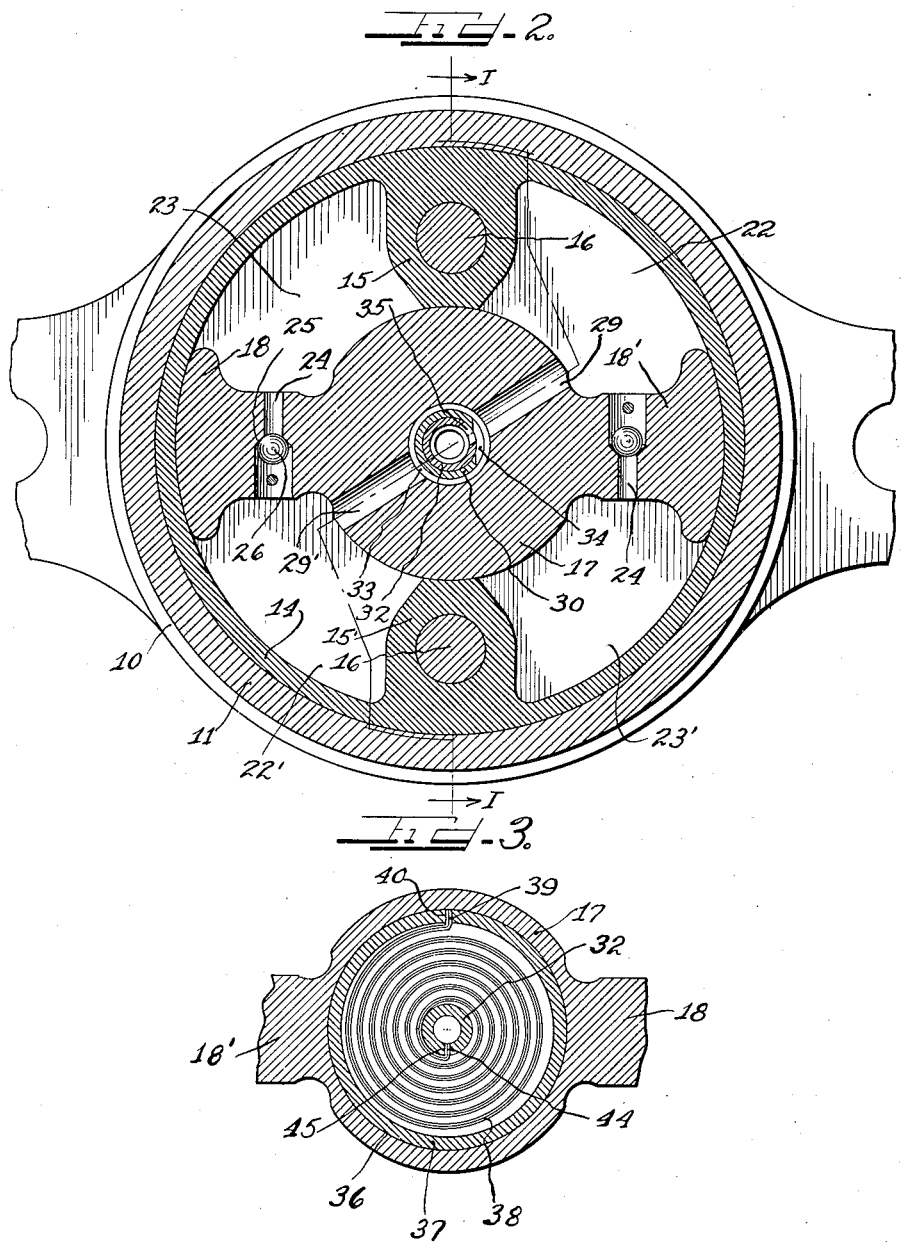
Inventor
Ralph F. Peo.
by Charles H. Niell Attys.

Patented June 25, 1935

2,005,751

UNITED STATES PATENT OFFICE 2,005,751

THERMOSTATIC VALVE STRUCTURE FOR HYDRAULIC SHOCK ABSORBERS

Ralph F. Peo, Buffalo, N. Y., assignor to Houde Engineering Corporation, Buffalo, N. Y., a corporation of New York Original application April 29, 1933, Serial No. 668,532. Divided and this application November 18, 1933, Serial No. 698,631

8 Claims. (Cl. 188—100)

This invention relates to thermostatic valve structure adapted particularly for use in hydraulic shock absorbers for controlling the bypassage of resistance fluid from one side of the piston structure to the other during operation of the shock absorber for determining shock absorbing resistance. This application is a division of the application of Ralph F. Peo, Serial No. 668,532, filed April 29, 1933, in which application my improved valve structure is fully disclosed but not claimed per se.

An important object of the invention is to provide simple, more economically manufactured and assembled, and more efficient and durable valve structure, which may be readily adjusted and set manually from the exterior of a shock absorber and which is then thermostatically adjusted for control of the bypassage resistance to fluid flow in accordance with variations in temperature of the resistance fluid.

A further object is to provide valve structure for hydraulic shock absorbers comprising two concentric rotary valve members having ports cooperable for control of the fluid flow in a shock absorber, with the outer member manually adjustable from the exterior of the shock absorber and the inner member thermostatically adjusted.

Another object is to provide a valve structure which may be readily inserted within the piston element of a shock absorber which piston element will then serve as a housing and support for the valve structure.

Still a further object is to provide a housing or container into which the inner valve member and the thermostat element of the valve structure are assembled before association of the inner valve member with the outer valve member, which housing will hold in alignment and protect the thermostat element which is preferably in the form of a spiral coil formed from a strip of bimetal whose metal layers are of material of different expansion coefficients.

The above enumerated and other features of the invention are shown incorporated in the structure disclosed on the drawings, in which drawings Figure 1 is a vertical section through the improved valve structure and a hydraulic shock absorber to which it is applied for the purpose of illustrating its operation, the section being on plane I—I of Figure 2;

Figure 2 is a section on plane II—II of Figure 1;

Figure 3 is a section on plane III—III of Figure 1;

Figure 4 is an inner end view of the valve structure housing showing the arrangement of the thermostat element enclosing housing.

I have shown my improved valve structure in service in a well-known type of hydraulic shock absorber for controlling the flow of the hydraulic resistance fluid. Briefly describing the shock absorber, it comprises the supporting base 10 having the cylindrical flange or wall 11 extending therefrom with an outer wall 12 received in the end of the cylindrical wall and held by the annular nut 13. The base with the cylindrical wall and the end wall define a cylindrical space into which fits the annular wall or ring 14 from which diametrically opposite partition lugs 15, 15 and 15' extend inwardly, this ring structure being secured by pins 16 extending through the lugs and into the base 10.

A piston structure comprises the cylindrical hub 17 and piston vanes 18 and 18' extending therefrom at opposite sides, the driving shaft 19 of the piston structure extending from the hub 17 through the bearing flange 20 on the outer wall 12, the end of the shaft having secured thereto a lever 21 usually connected with the vehicle axle while the shock absorber body is connected at its base to the vehicle chassis. The end surfaces of the vanes 18 and 18' engage the cylindrical inner surface of the ring 14 while the hub engages the inner surfaces of the partition lugs 15 and 15', the piston structure together with the partition lugs dividing the space within the ring into high pressure chambers 22 and 22' and low pressure chambers 23 and 23'.

Each of the piston vanes has a passage 24 therethrough providing a seat 25 for a check valve 26, such as a ball, the valves being arranged so that the resistance fluid may flow from the low pressure chambers to the high pressure chambers during low pressure movement of the piston structure, as when the vehicle chassis and axle move toward each other, but so that the valves will close the bypassage against flow from the high pressure to the low pressure chambers during the high pressure or rebound movement of the vehicle, as when the chassis and axle are separated by the vehicle spring recoil.

A separate more restricted pass is provided for flow of fluid from the high pressure to the low pressure chambers and this pass is also available for flow from the low pressure to the high pressure chambers in addition to the flow through the bypassageways 24. Provision is made to control the high pressure flow in accordance with change in temperature and viscosity of the fluid so that the shock absorber resistance will remain uninfluenced by such viscosity changes. This automatic control may be efficiently accomplished by means of my improved valve mechanism which will now be described. In the arrangement shown, the piston hub and shaft serve as the enclosing and supporting housing for the valve structure. The shaft has the axial bore 27 therethrough which at its inner end is slightly enlarged in diameter to provide the cylindrical chamber 28 which is connected by the ducts 29 and 29′ with the high pressure chambers 22 and 22′, these ducts extending radially through the piston hub 17. Within the valve chamber 28 is the outer valve member or frame 30 which is cylindrical and has the cylindrical bore 31 for receiving and seating the inner valve member 32. The outer valve member 30 has the circumferentially extending channel 33 in its outer side forming a connection between the inner end of the ducts 29 and 29′, and the member 30 has the port 34 therethrough communicating with the channel, the port shown being a circumferentially extending slot. The inner valve member 32 has a port 35, shown as a circumferentially extending slot for cooperating with the port 34 to control the fluid flow. The inner valve member 32 is shown to be of tubular construction, forming a passage communicating with the port 35 and included in the bypass circuit.

In the inner end of the piston structure hub 17 is the cylindrical pocket 36 which is concentric with the valve chamber 28. This pocket serves to receive and house the thermostat structure for controlling the valve operation. The structure comprises a cylindrical cup 37 which may readily be formed of sheet metal, the cup being of such outer diameter as to frictionally fit into the pocket 36. Within the cup is the spiral thermostat coil 38 formed from a strip of bimetal whose metal layers are of material of different expansion coefficients. The outer end 39 of the coil is anchored to the cup, the end being deflected to extend radially into a slot 40 formed in a cylindrical wall of the cup. The cup is inserted in the pocket 36 with its bottom side out so as to form a closure for the pocket. The cup receives the outer end of the tubular inner valve member 32 and in its bottom has the opening 41 registering with the bore of the valve member. The depth or axial width of the cup is less than the depth of the pocket 36 so that after insertion of the cup in the pocket there will remain a shallow space or chamber 42 between the cup bottom and the base 10 which base or chamber is connected by ports 43 and 43′ with the low pressure chamber 23 and 23′ respectively, the bypassage from the high pressure chambers to the low pressure chambers thus including the ducts 29 and 29′, the channel 33, the valve ports 34 and 35, the bore of valve 32, the opening 41 through the cup bottom, the chamber 42, and the ports 43 and 43′.

The inner end 44 of the thermostat coil is deflected radially and is received in the longitudinal slot 45 in the inner valve member 32 so that, during winding and unwinding movement of the coil in response to temperature change, the inner valve member will be rotated for adjustment of its port 35 relative to the port 34 in the outer valve member.

The outer valve member 30 has a stem 46 extending axially therefrom and through the bore 27 in the housing 20, the outer end of the stem being threaded for the reception of a nut 47, the outer end of the valve member seating against the annular shoulder 48. By loosening the nut 47, the stem 46 may be turned for rotary movement of the outer valve member 30 and setting of its port 34 relative to the inner valve port 35. The outer end of the stem may be provided with a screw driver slot 49 for facilitating turning thereof and a spring washer 50 is preferably inserted between the nut and the shaft so that after adjustment of the outer valve member and tightening of the nut the adjustment will remain fixed.

After the piston structure, which receives and forms a housing for the valve structure, is assembled in the shock absorber, manual adjustment is made of the outer valve member 30 for setting of the valve ports for fluid flow for shock absorber resistance under normal temperature. This setting will be maintained if the temperature does not change. If the shock absorber and the fluid should become heated and the fluid become less viscous, the thermostat coil will respond to the increased temperature and will automatically rotate the inner valve member for less overlap of its port 35 with the port 34 of the outer valve member so that the flow or shock absorber resistance will remain the same as that under normal temperature conditions. If the temperature should become reduced below normal and the fluid become more viscous, the thermostat coil will respond to adjust the inner valve member for greater port overlap to compensate for increase in viscosity and to retain the shock absorber resistance normal.

During the rebound stroke of the shock absorber, that is, when the vehicle spring tends to rapidly recoil to move the vehicle body away from the axle, the piston structure will rotate in counter-clockwise direction (Figure 2) during which rotation the bypassages 24 will be held closed by the ball valves so that the only escape of fluid from the high pressure chambers to the low pressure chambers will be through the restricted passage provided by the overlapping ports 34 and 35, the flow being from the high pressure chambers 22 and 22′ to the ducts 29—29′, through the channel 33 and then through the valve ports and the inner valve member to the chamber 42 and from there through the ports 43 and 43′ to the low pressure chambers.

During the so-called bump stroke of the piston when the axle and vehicle body come together, the piston structure will rotate in clockwise direction (Figure 2), and the greater part of the fluid flow from the low pressure chambers to the high pressure chambers will be through the bypassages 24, the remaining flow being through the passage controlled by the valve ports 34 and 35.

By providing a cylindrical pocket 36 of comparatively large diameter, a large spiral thermostat coil having many turns will be accommodated which will be very sensitive to temperature changes and powerful to accurately adjust the bypassage resistance in accordance with temperature and viscosity changes. Furthermore, the thermostat coil will have a comparatively large range of angular adjustment of the inner valve member. The container cup for the coil will protect the coil against injury before assembly in the pocket 36 and after assembly the coil will be entirely housed and protected against injury and tampering, and the cup and adjacent wall of the housing will accurately guide the winding and unwinding movement of the coil so that the turning resistance of the valve will be reduced to a minimum.

I have shown a practical and efficient embodiment and application of the features of my invention, but I do not desire to be limited to the exact construction and arrangement shown and described as changes and modifications may be made without departing from the scope of the invention as outlined in the accompanying claims.

I claim as follows:

1. A valve structure for hydraulic shock absorbers comprising a housing having a bypass therethrough for the flow of the resistance fluid of a shock absorber, said housing having an axial bore intersecting said bypass, a rotary valve seated in said bore and having a port, said bore being enlarged at one end to form a cylindrical pocket, and a spiral thermostat element in said pocket connected to rotate said valve for setting of its port in said bypass in accordance with change in temperature of the resistance fluid flowing through said bypass.

2. A valve structure for controlling the flow of resistance fluid in a hydraulic shock absorber, comprising a housing having a bore therethrough, a resistance fluid by-pass intersecting said bore, a cylindrical outer valve member within said bore having a port communicating with said bypass, an inner valve member seated in said outer valve member and having a port for cooperating with the port of the outer member to control the flow through said bypass, a stem extending from said outer valve member and being manually operable for rotation of said outer valve member for relative setting of said ports, the inner end of said bore being enlarged to form a pocket, and a thermostat coil in said pocket connected to rotate said inner valve member for setting of said ports in accordance with change in the temperature of the resistance fluid.

3. A valve structure for controlling the flow of resistance fluid in a hydraulic shock absorber comprising a housing having a bore therethrough, a bypass through said housing intersecting said bore, a cylindrical outer valve member within said bore having a port communicating with said bypass, an inner valve member seated in said outer valve member and having a port for cooperating with the port of the outer member to control the flow of resistance fluid through said bypass, a stem extending from said outer valve member through said bore and being manually operable for rotation of said outer valve member for relative setting of said ports, the inner end of said bore being enlarged to form a pocket, a cup in said pocket receiving the outer end of said inner valve member, and a thermostat coil in said cup connected at one end to said cup and connected at its other end with said inner valve member for rotating said inner valve member for setting of said ports for adjustment of the bypassage flow in accordance with change in temperature of the resistance fluid.

4. A valve structure for controlling the flow of resistance fluid in a hydraulic shock absorber comprising a housing having a passage for the flow of resistance fluid, a valve journalled in said housing and having a port for controlling said passage, said housing having a cylindrical pocket concentric with said valve, a cylindrical cup seated in said pocket with its bottom forming a closure therefor, and a thermostat coil in said cup connected with said valve for automatic adjustment thereof in accordance with change in temperature of the resistance fluid.

5. A fluid flow controlling valve structure comprising a housing having a cylindrical pocket and a cylindrical valve chamber concentric with said pocket, an inner rotary valve member having a bore therethrough, a fluid flow passageway through said housing including said valve bore, a spiral thermostat element in said pocket surrounding the outer end of said inner valve member and secured at one end thereto and at its other end to said housing, the inner end of said valve extending into said valve chamber, an outer valve member in said valve chamber surrounding and journalling the inner end of said inner valve member, said outer and inner valve members having ports registering with said passageway, means for manually setting said outer valve member for setting of said ports, said thermostat element responding to change in temperature to automatically rotate said inner valve member for setting of said ports in accordance with change of temperature of fluid going through said passageway.

6. A valve structure for controlling the flow of resistance fluid in a hydraulic shock absorber and comprising a housing having a longitudinal bore therethrough and a fluid passage connecting said bore with the exterior of said housing, a valve structure in said bore comprising relatively movable valve members, said valve members having ports arranged for inclusion in said fluid passage and for varying overlap for controlling the fluid flow, a thermostat element confined in the inner end of said bore and connected with one of said valve members for automatically effecting movement thereof for adjustment of said ports, and means extending through the outer end of said bore and operable from the exterior thereof for manually moving the other valve member for adjustment of said ports.

7. A valve structure for controlling the flow of resistance fluid in a hydraulic shock absorber and comprising a housing having a longitudinal bore providing a valve chamber intermediate its ends and a thermostat chamber at its inner end, said housing having a laterally extending fluid passage connecting said valve chamber with the exterior of the housing, a valve structure in said valve chamber comprising outer and inner valve members having ports and arranged for relative rotation for varying overlap of said ports, a thermostat coil in said thermostat chamber connected with said inner valve member for rotation thereof for adjustment of said port, means in the outer end of said bore whereby said outer valve member may be manually rotated for setting of said ports, said inner valve member having a bore communicating with the exterior of said housing at the inner end thereof, said ports being interposed between said valve bore and said lateral passage.

8. A valve structure for controlling the flow of resistance fluid in a hydraulic shock absorber comprising a housing having a passage for the flow of resistance fluid, a valve journalled in said housing and having a port for controlling said passage, said housing having a pocket concentric with said valve, a cylindrical cup seated in said pocket with its bottom forming a closure therefor, and a thermostat element in said cup connected with said valve for automatic adjustment thereof in accordance with change in temperature of the resistance fluid.

RALPH F. PEO.